US006456773B1

(12) United States Patent
Keys

(10) Patent No.: US 6,456,773 B1
(45) Date of Patent: Sep. 24, 2002

(54) DISPERSION COMPENSATION MODULE

(75) Inventor: Curtis Keys, Reisterstown, MD (US)

(73) Assignee: Ciena Corporation, Linthicum, MD (US)

( * ) Notice: Subject to any disclaimer, the term of this patent is extended or adjusted under 35 U.S.C. 154(b) by 0 days.

(21) Appl. No.: 09/551,131

(22) Filed: Apr. 17, 2000

Related U.S. Application Data

(60) Provisional application No. 60/130,981, filed on Apr. 26, 1999.

(51) Int. Cl.[7] .................................................. G02B 6/00
(52) U.S. Cl. ........................................ 385/135; 385/134
(58) Field of Search ................................ 385/134–136, 385/147

(56) References Cited

U.S. PATENT DOCUMENTS

| | | | | |
|---|---|---|---|---|
| 5,127,082 A | | 6/1992 | Below et al. ................ | 385/135 |
| 5,608,562 A | | 3/1997 | Delavaux et al. ........... | 359/161 |
| 5,612,807 A | | 3/1997 | Ishikawa et al. ............ | 359/161 |
| 5,645,449 A | | 7/1997 | Sabo ....................... | 439/540.1 |
| 5,703,990 A | | 12/1997 | Robertson et al. .......... | 385/135 |
| 5,715,348 A | * | 2/1998 | Falkenberg et al. ......... | 385/135 |
| 5,909,298 A | | 6/1999 | Shimada et al. ............ | 359/163 |

FOREIGN PATENT DOCUMENTS

| | | | | |
|---|---|---|---|---|
| EP | 0514638 A1 | 11/1992 | ............ | G02B/6/44 |
| WO | 0011815 | 2/2000 | ........... | H04B/10/18 |

OTHER PUBLICATIONS

Patent Abstracts of Japan, vol. 013, No. 185, p. 865, 1989.
Patent Abstracts of Japan, vol. 1998, No. 08, 1998.

* cited by examiner

Primary Examiner—John D. Lee
(74) Attorney, Agent, or Firm—David L. Soltz

(57) ABSTRACT

Consistent with the present invention, a dispersion compensation module is provided which comprises a housing accommodating one or more spools of DCF. Each spool is provided in a respective package, which can be slidably inserted into or removed from the housing along a track provided within the housing. "Jumpers" or relatively short pieces of fiber can be used to interconnect the spools through adapters external to the packages. As a result, spools of DCF can be readily coupled to one another to provide a desired amount of dispersion compensation. Moreover, the adapters are geometrically configured so that connections can be made to the spools without excessively bending fiber interconnecting the DCF and the DCF itself, while permitting the module to conform to fiber optic packaging standards.

15 Claims, 8 Drawing Sheets

DISPERSION COMPENSATION MODULE

The present application claims the benefit of U.S. Provision Patent Application Ser. No. 60/130,981, filed Apr. 26, 1999.

FIELD OF THE INVENTION

The present invention is directed toward optical communication systems incorporating dispersion compensation and particularly such systems having an adjustable amount of dispersion compensation and to components of such systems.

BACKGROUND OF THE INVENTION

Optical signals transmitted in a fiber optic communication system typically constitute a series of pulses of digital information. Although the pulses are usually at a single nominal wavelength, each pulse is actually composed of different spectral components. The spectral components of each pulse propagate through the transmission fiber at different speeds with higher frequency components traveling slower than lower frequency components in non-dispersion shifted optical fiber. This effect, known as "chromatic dispersion", can result in spectral components of one pulse arriving at a receiver at substantially the same time as a succeeding pulse, thereby causing degraded receiver sensitivity. Chromatic dispersion becomes increasingly pronounced at higher bit rates, e.g. those associated with synchronous optical network (SONET) OC-192 transmission speeds.

Typically, optical signals propagating through transmission optical fiber experience a positive dispersion. Accordingly, dispersion compensated fiber (DCF) having a negative dispersion can be coupled to the transmission optical fiber in order to offset the chromatic dispersion thereof. The amount of dispersion experienced by an optical signal depends on the distance traveled through the transmission optical fiber. Shorter lengths of transmission optical fiber require less compensation than longer lengths. Likewise, longer lengths of DCF are used when more compensation is required, and shorter lengths of DCF are provided when less compensation is needed. Each segment of transmission optical fiber, however, requires a unique length of DCF in order to provide an appropriate amount of dispersion compensation.

In a fiber optic network, many different lengths or spans of transmission optical fiber are used to connect various points within the network. According to the conventional approach to dispersion compensation described above, a unique length of DCF must be cut for each span. If the network contains many spans, a corresponding number of DCF fibers must be provided, each having a different length. As a result, the conventional approach to dispersion compensation in such instances can be inefficient and time consuming.

Dispersion compensating modules have been proposed including segments of DCF fiber of varying length to provide tailored dispersion compensation. Some of the DCF segments have a positive dispersion, while others have a negative dispersion. Selected DCF segments are coupled to one another to provide a desired net dispersion to offset the dispersion associated with the transmission optical fiber. Thus, rather than provide a unique segment of DCF for each span, the same dispersion compensationmodule can be used for spans of varying length and fiber types by simply connecting appropriate segments of DCF within the module.

The segments of DCF to be included in the dispersion compensation module are typically wound about standard-sized spools. The spools, in turn, are housed within a package. If used in the United States, however, the package should conform to a Network Equipment—Building System ("NEBS") standard, as well as other standards dictating fiber packaging dimensions in order to be a commercially attractive. Moreover, the spools should be readily coupled to one another in order to provide the desired compensation, but still conform to these, as well as any other pertinent, standards.

SUMMARY OF THE INVENTION

Consistent with the present invention, a dispersion compensation module is provided which comprises a housing accommodating one or more spools of DCF. Each spool is provided in a respective package, which can be slidably inserted into or removed from the housing along a track provided within the housing. "Jumpers" or relatively short pieces of fiber can be used to interconnect the spools through adapters external to the packages. As a result, spools of DCF can be readily coupled to one another to provide a desired amount of dispersion compensation. Moreover, the adapters are geometrically configured so that connections can be made to the spools without excessively bending fiber interconnecting the DCF and the DCF itself, while permitting the module to conform to fiber optic packaging standards.

BRIEF DESCRIPTION OF THE DRAWINGS

Advantages of the present invention will be apparent from the following detailed description of the presently preferred embodiments thereof, which description should be considered in conjunction with the accompanying drawings in which.

DETAILED DESCRIPTION

Figure 1:
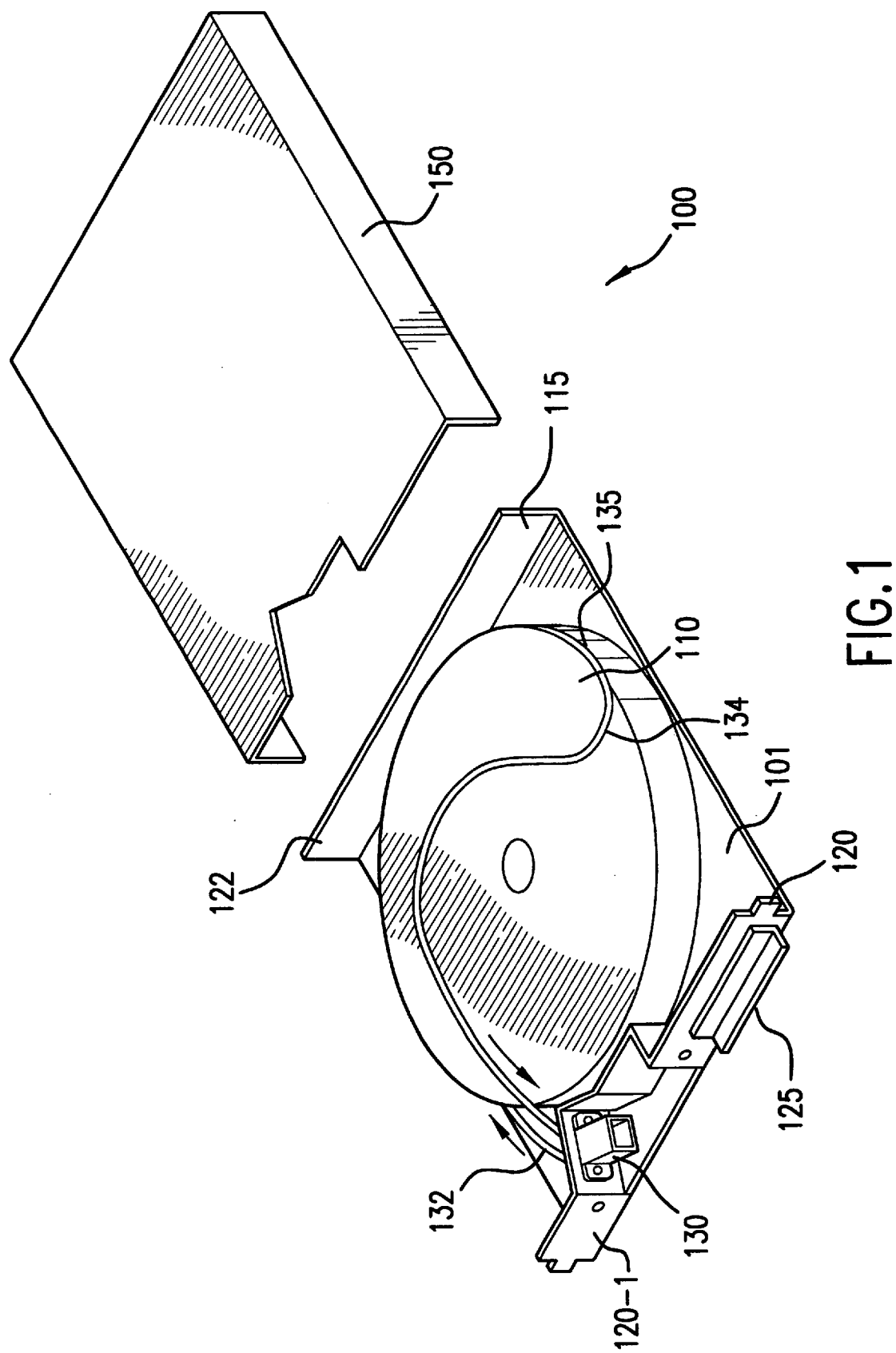
FIG. 1 illustrates an isometric view of a package housing a spool of DCF in accordance with an aspect of the present invention.

Turning to the drawings in which like reference characters indicate the same or similar elements in each of the several views, FIG. 1 illustrates a package 100 housing a segment of DCF wrapped or wound around spool 110. Spool 110 is mounted within a tray 115 having protective walls 120 and 122, as well as covering 150 for securing spool 110. Adapter 130 provides an external optical connection to spool 110, and is typically recessed within package 100. Connecting fiber 132 receives input optical signals through adapter 130, while connecting fiber 134 feeds optical signals output from spool 110 to adapter 130.

As further seen in FIG. 1, spool 110 is provided on a primary surface 101 of tray 115. Wall 120 extends from primary surface 101 and has an associated second surface. Optionally, a handle 125 can be provided on the secondary surface to manually grasp tray 115 and package 100.

Figure 2:
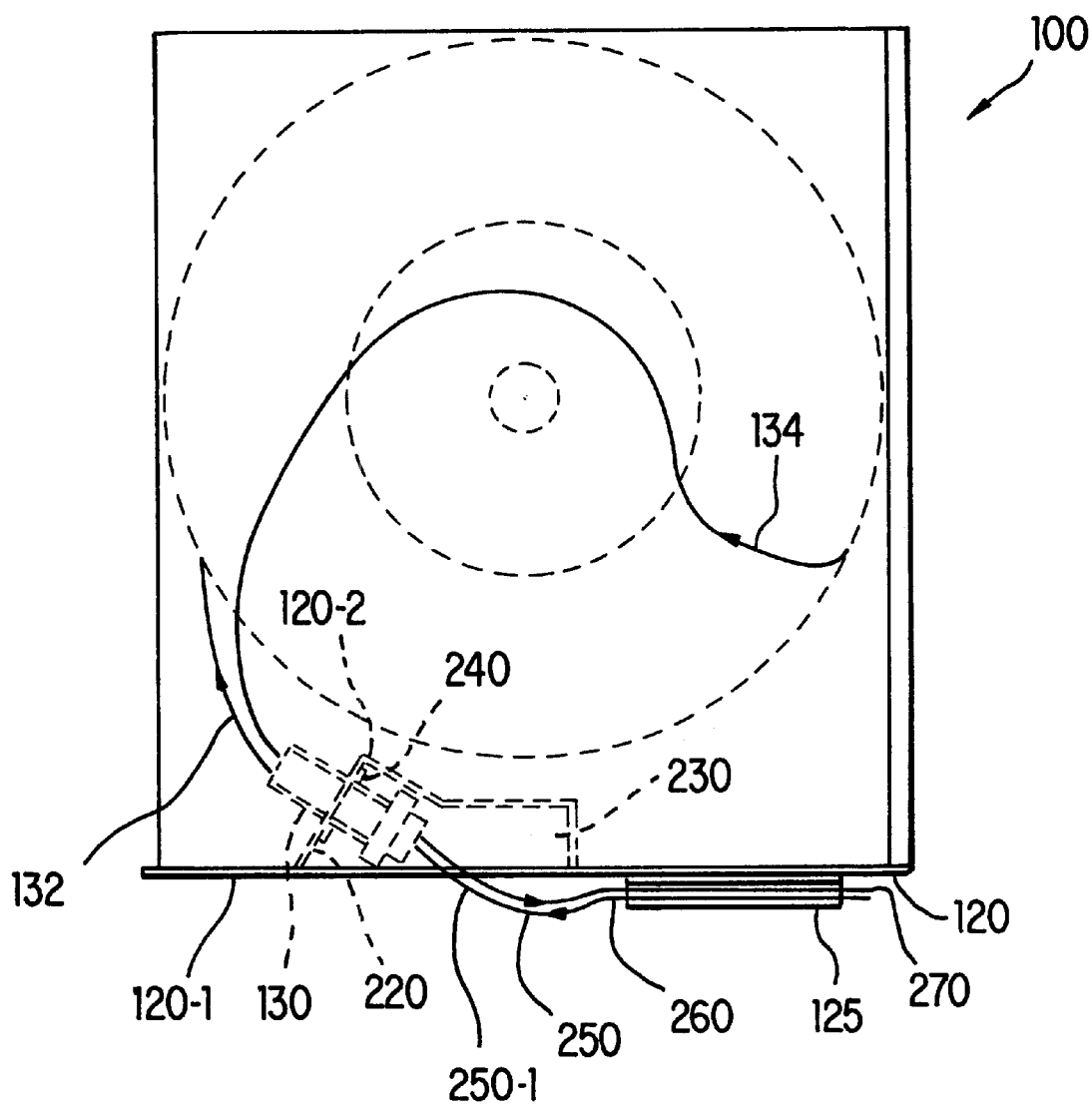
FIG. 2 illustrates a plan view the tray shown in FIG. 1.

FIG. 2 illustrates a top view of package 100, and further shows connections of input and output fibers 260 and 270, respectively. Fibers 260 and 270 are coupled to package fibers 132 and 134, respectively through a conventional "boot" connector 250, which plugs into adapter 130. As further shown in FIG. 2, fibers 260 and 270 may be guided by handle 125.

Connector 250 has a curved portion 250-1, which is typically greater than a bend radius of the fiber below which the fiber may break or induce non-linearities into the transmitted optical signals. Curved portion 250-1 of connector 250 can extend beyond package 100 by an amount exceeding accepted standards, if not appropriately accommodated by adapter 130. Thus, in accordance with a feature of the present invention, package wall 120 has a recessed portion 230 receiving boot 250. In addition, adapter 130 is mounted at an angle within wall 130. This angle can be, for example, 60 degrees relative to wall portion 120-1. Adapter 130 also forms a second angle, e.g., 90 degrees, with a second wall portion 120-2. These angles are exemplary, and are typically chosen so that a conventional boot connector does not extend excessively beyond package 100. Different connectors may require adapter 130 to be positioned at different angles.

Figure 3:
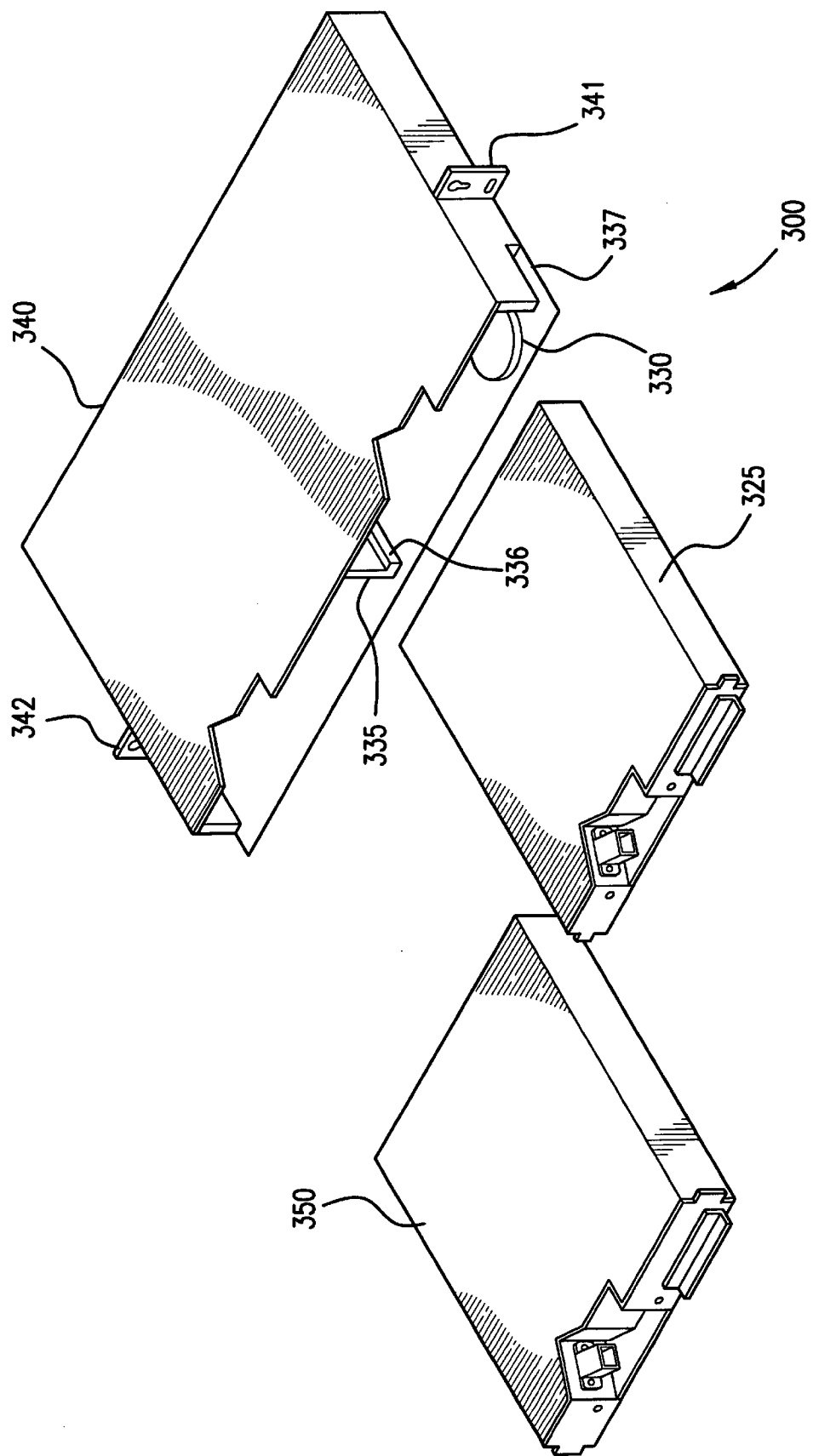
FIGS. 3–5 illustrate a dispersion compensation module in accordance with a first embodiment of the present invention.

FIG. 3 illustrates a dispersion compensation module 300 in accordance with an aspect of the present invention. Module 300 includes packages 325 and 350, which are similar to package 100 and slidably provided within a housing 340. Package 325, however, can be inserted into housing 340 along rail 335. Package 335 rests on protrusion 336 of rail 335 and substantially arcuate, rounded or disk-shaped member 330. A slot 337 in housing 340 receives fiber input and output to module 300. In addition, brackets 341 and 342 are optionally provided for mounting module 330 within a cabinet or other suitable structure.

Figure 4:
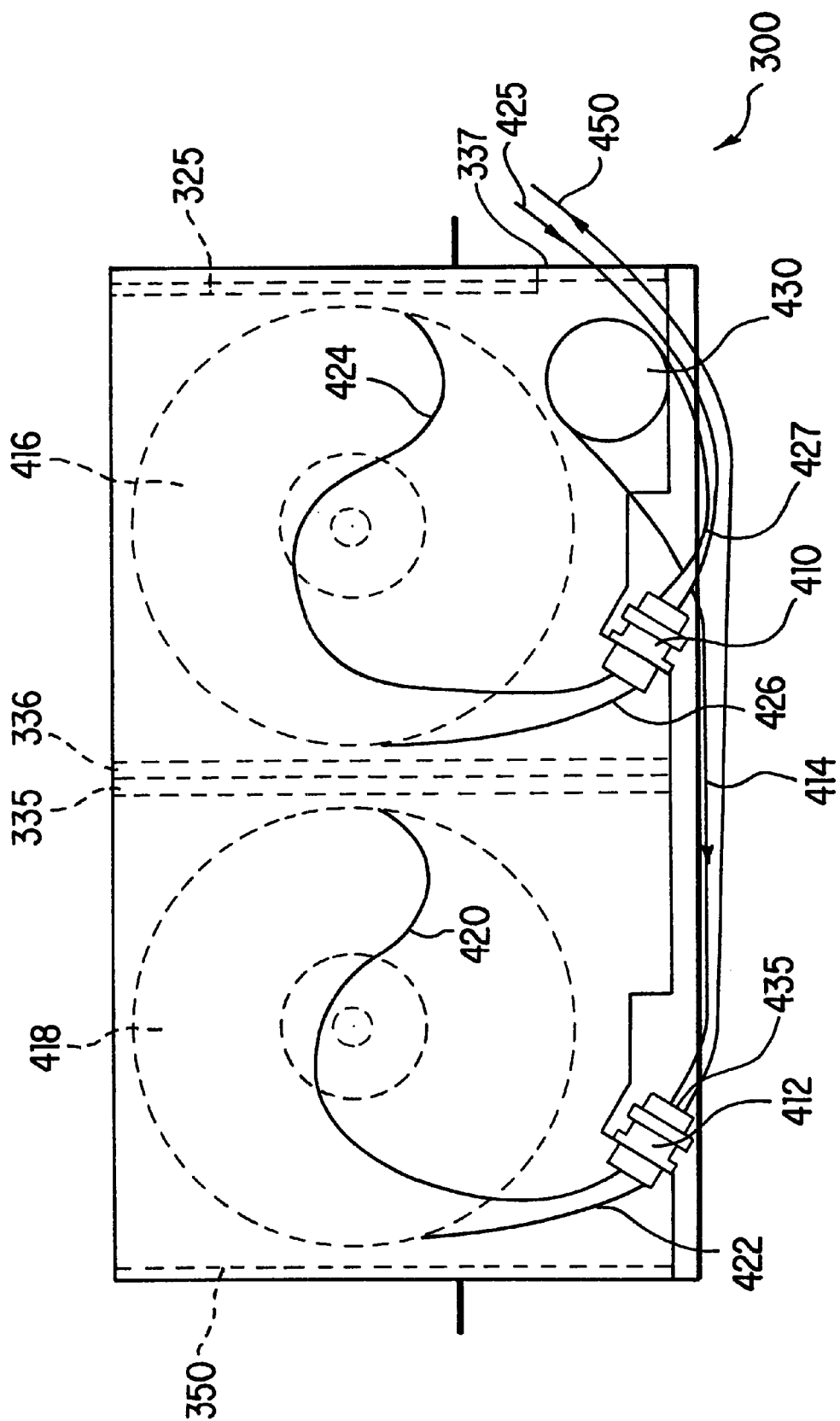

FIG. 4 shows a plan view of module 300 with packages 325 and 350 inserted therein. Packages 325 and 350 include spools of DCF 416 and 418 similar to that shown in FIGS. 1 and 2. Moreover, connecting fibers 420, 422 and 424, 426 respectively connect spools 418 and 416 to corresponding adapters 412 and 410 in a manner similar to that of fibers 132 and 134 shown in FIG. 2. Input fiber 425 is coupled to boot connector 427, and supplies optical signals to spool 416 in package 325. Optical signals output from package 325 are supplied to a short piece of optical fiber or "jumper", which loops around a substantially arcuate or disc shaped member 430. The radius of member 430 is selected so that the jumper is not bent below a minimum bend radius of the fiber. Member 430 can further insure that input fiber 425 is also not bent below the bend radius. As further shown in FIG. 4, the jumper fiber is looped around member 430 and coupled to boot 435. The optical signals are thus fed to spool 418 of package 350 through adapter 412 for further dispersion compensation, as desired. The signals are then output from package 350 to another jumper fiber 450 for output from module 300.

Figure 5:
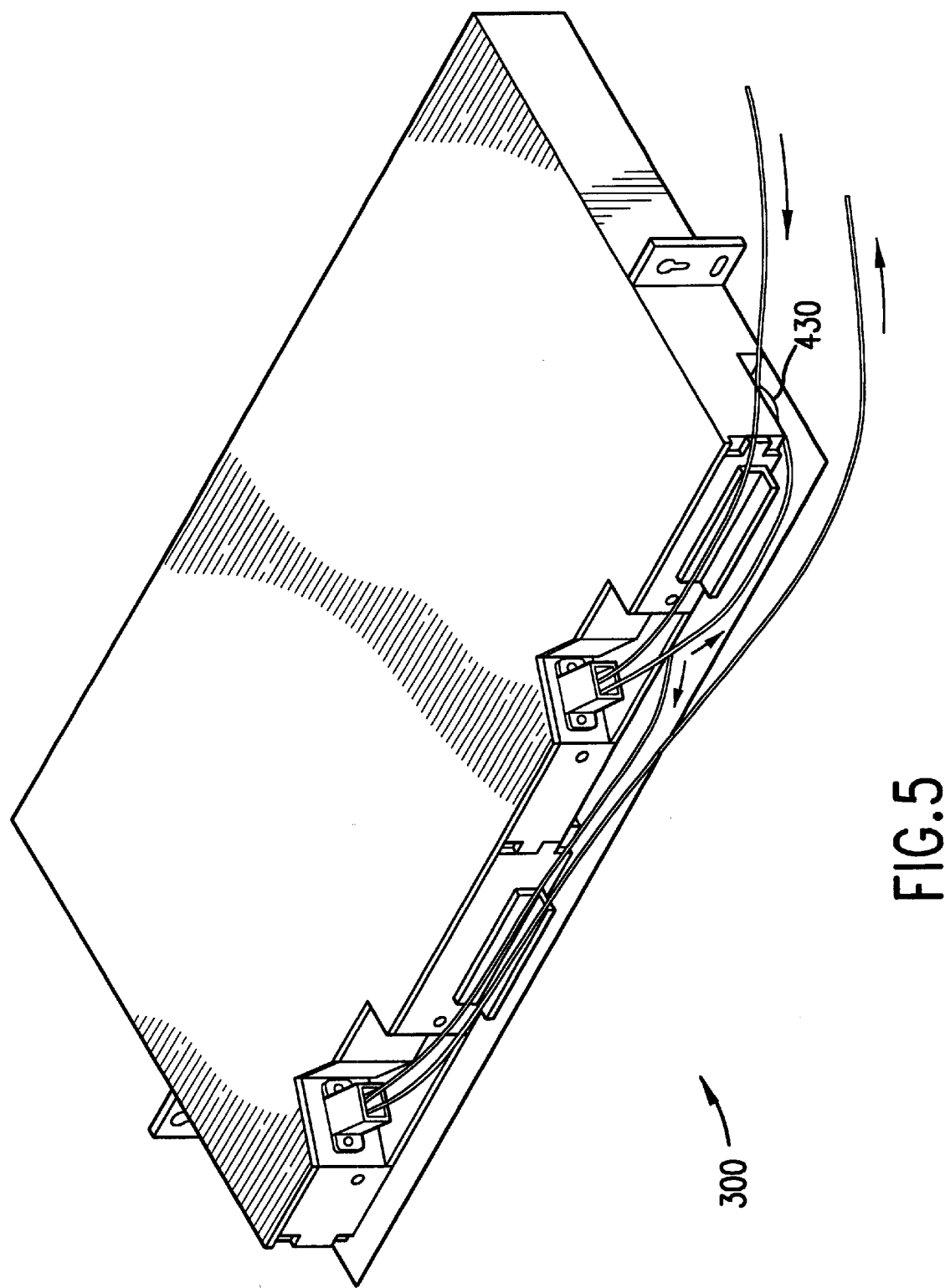

Advantageously, boot connectors 412 and 427 are easily removed from adapters 410 and 412 respectively, so that packages 325 and 350 can be readily slid out of module 300. FIG. 5 illustrates an isometric view of module 300.

Figure 6:
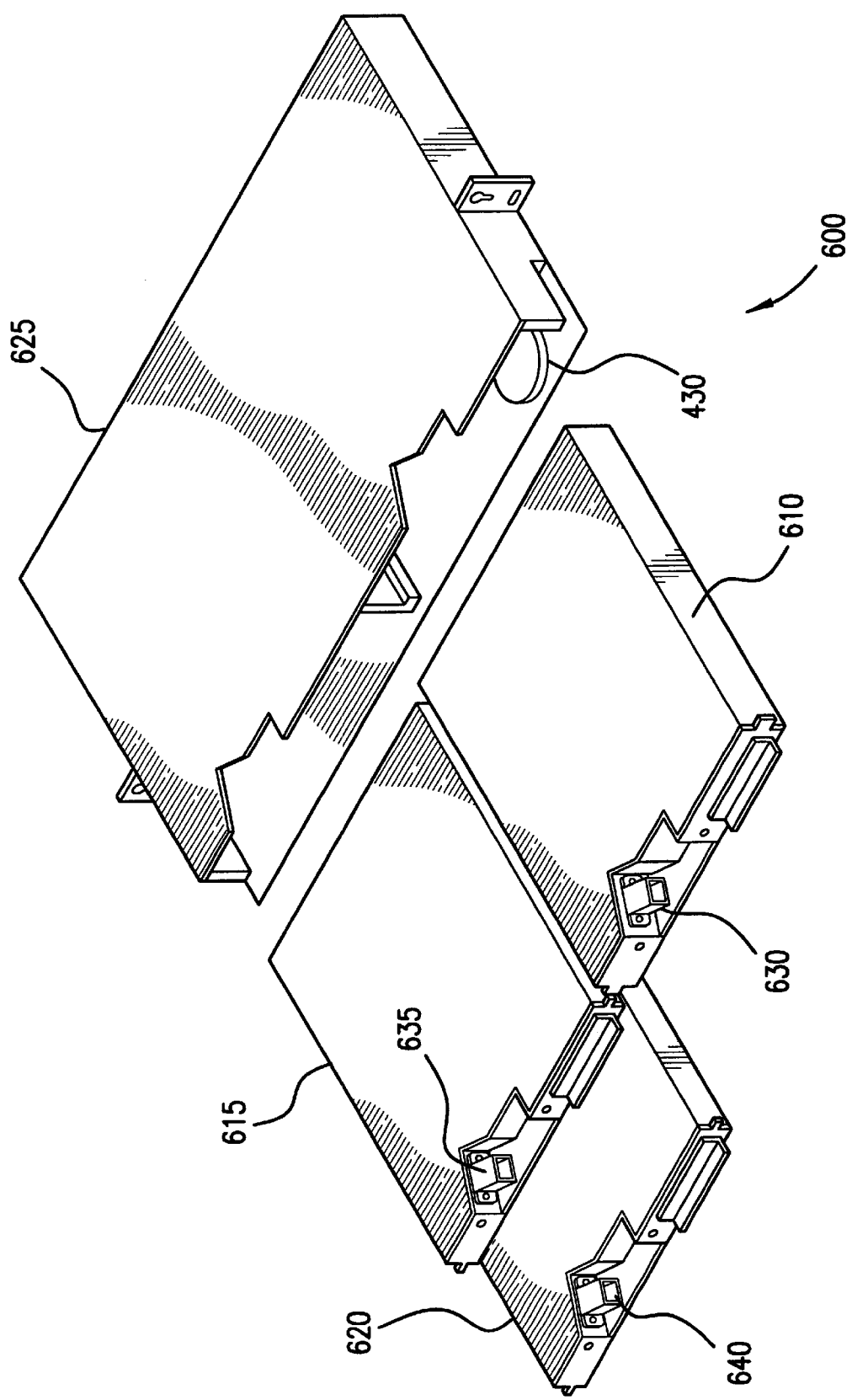
FIGS. 6–7 illustrate a dispersion compensation module in accordance with a second embodiment of the present invention.
Figure 7:
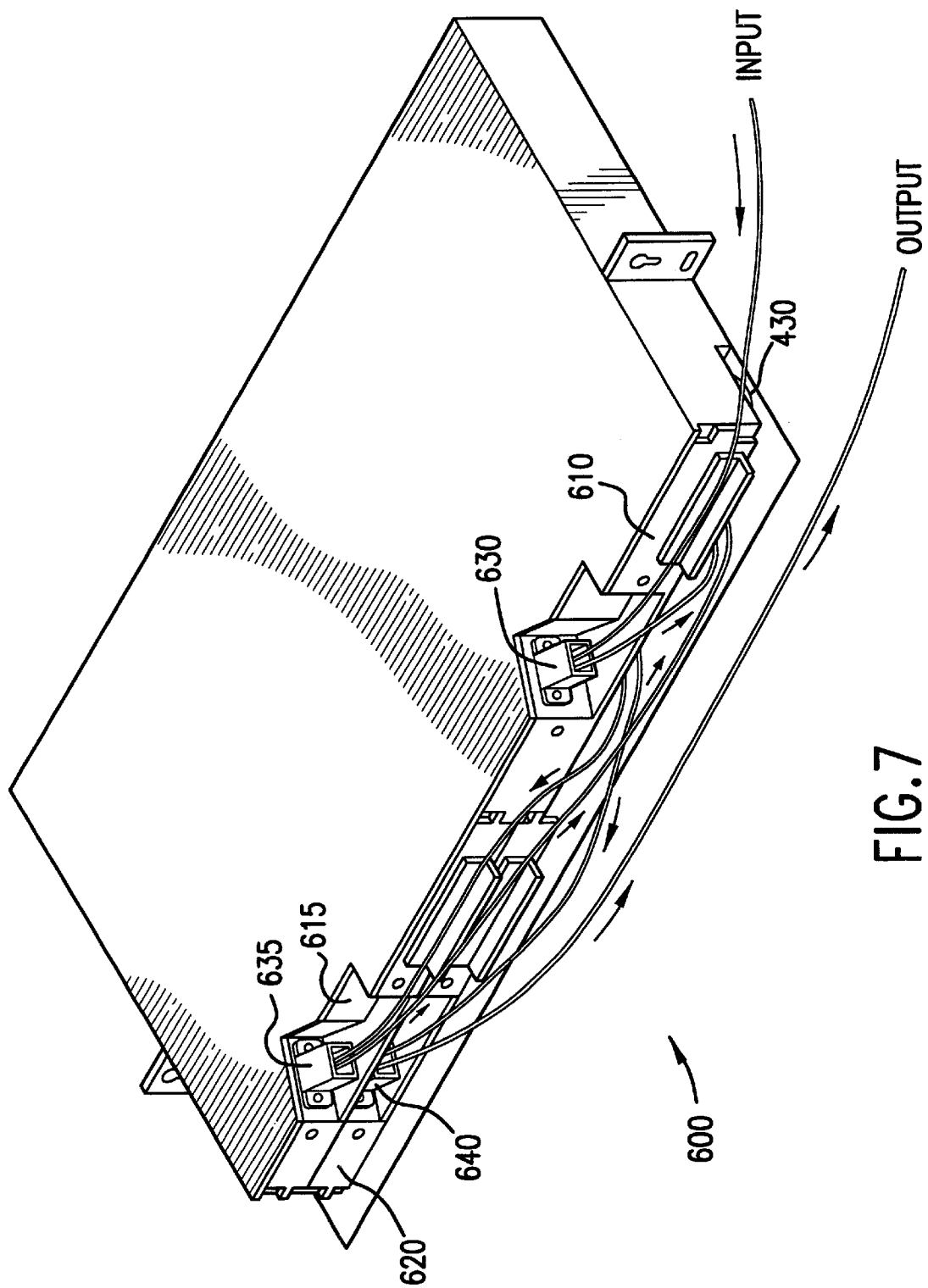

FIG. 6 illustrates an alternative module 600 comprising three packages 610, 615 and 625 slidably provided within housing 625. Housing 625 is similar to housing 340, and includes a substantially round or arcuate member 430. The construction of packages 610 is similar to that of package 325 described above. Packages 615 and 620 are, likewise similar to package 350, but the heights of these packages is less than package 350 so that both packages can fit within housing 625. External connections to packages 610, 615 and 625 are shown in FIG. 7. For simplicity, boot connectors are not shown.

As seen in FIG. 7, an input fiber supplies optical signals to a DCF spool contained in package 610 through an adapter. The optical signals are then output from the spool through adapter 630 to a jumper fiber, which is looped around member 430 and coupled to adapter 630. The signals are further compensated by a spool within package 615 output to an additional jumper which is also looped about member 430 and coupled to adapter 640, which feed the signals to a spool within package 620 for further compensation. The signals are next output from the spool and output from module 600 through an additional fiber.

As in the above described embodiment, packages 610, 615 and 620 are readily inserted into and removed from housing 625, so that appropriate DCF spools can be easily coupled to a fiber optic communication system. In addition, the dimensions of the module and package satisfy NEBS as well as other adopted standards, including Bellcore standards.

Figure 8:
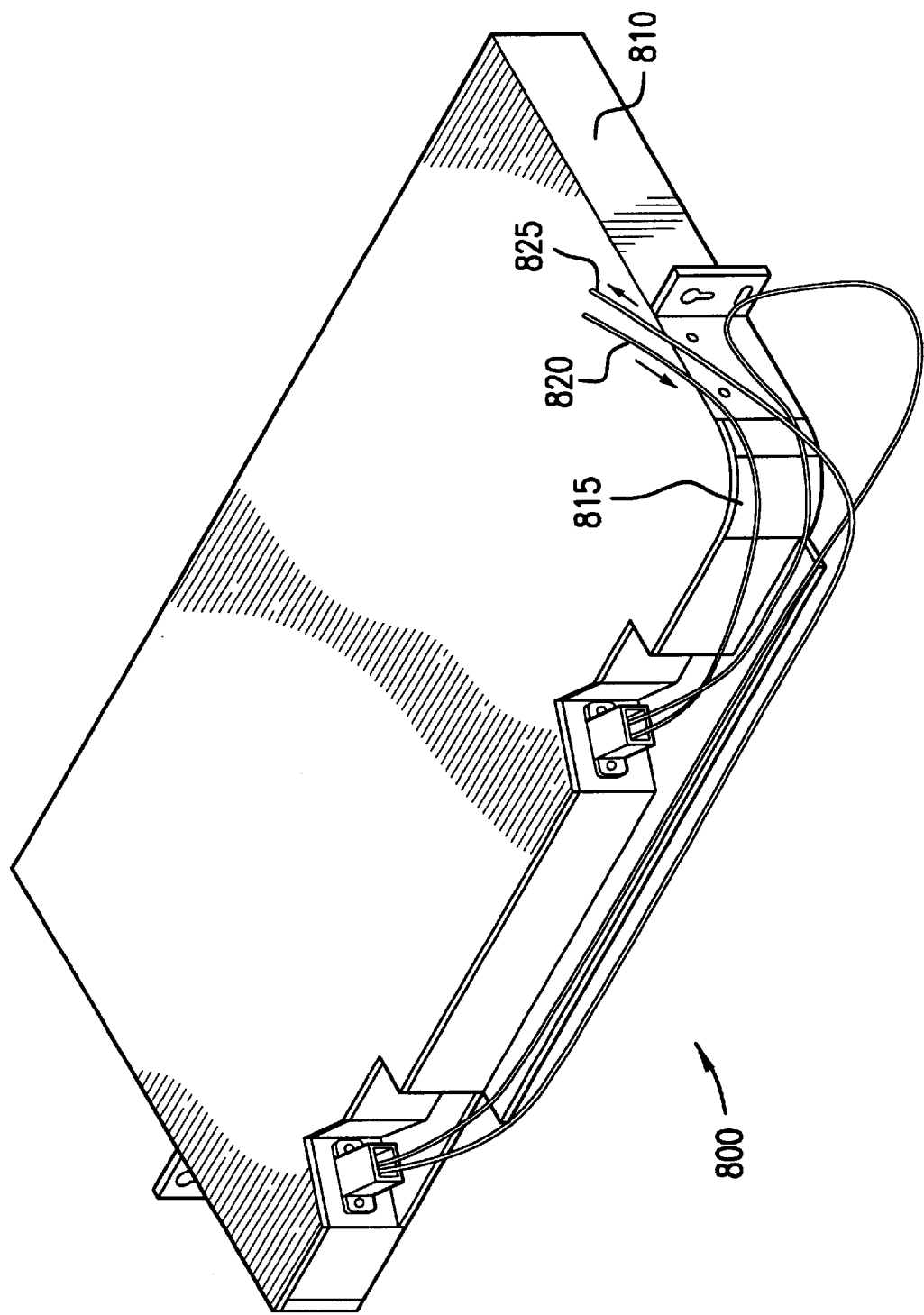
FIG. 8 illustrates a dispersion compensation module in accordance with a third embodiment of the present invention.

FIG. 8 illustrates a further embodiment of the present invention, whereby module 800 includes a sealed housing 810 containing the DCF spool packages. In this instance, member 430 can be omitted and replaced by a substantially rounded member 815, which prevents input and output fibers 820 and 825 from being bent beyond an acceptable bend radius.

While the foregoing invention has been described in terms of the embodiments discussed above, numerous variations are possible. Accordingly, modifications and changes such as those suggested above, but not limited thereto, are considered to be within the scope of the following claims.

What is claimed is:

1. An optical device, comprising:

a housing;

a tray removably disposed within said housing;

a segment of dispersion compensating fiber provided in said tray, said segment of dispersion compensating fiber having first and second end portions; and a fiber-optic adapter coupled to first and second end portions of said segment of dispersion compensating fiber.

2. An optical device according to claim 1, further comprising a handle coupled to said tray, to thereby manually remove said tray from said housing.

3. An optical device according to claim 1, a rail provided in said housing, said tray being slidably disposed on said rail.

4. An optical device according to claim 1, further comprising a spool, said segment of dispersion compensating fiber being wrapped around said spool.

5. An optical device according to claim 1, wherein said tray has a primary surface and a secondary surface, said segment of dispersion compensating fiber being provided on said primary surface of said tray and said secondary surface extending from said primary surface, said adapter being oriented at an angle relative to secondary surface.

6. An optical device in accordance with claim 1, wherein said adapter is recessed within said housing.

7. An optical device comprising:

a first tray;

a first section of dispersion compensating fiber provided on said tray;

a second tray;

a second section of dispersion compensating fiber provided on said tray;

a housing configured to receive said first and second trays, said first and second trays being slidably disposed within said housing; and a segment of optical fiber coupling said first section of dispersion compensating fiber to said second section of dispersion compensating fiber.

8. An optical device in accordance with claim 7, further comprising a substantially arcuate member provided in said housing, said segment of optical fiber being looped about said substantially arcuate member.

9. An optical device in accordance with claim 8, wherein said substantially arcuate member has a radius which exceeds a minimum bend radius associated with said segment of optical fiber.

10. An optical device in accordance with claim 7, further comprising a first fiber optic adapter coupled to said first tray and a second fiber optic adapter coupled to said second tray, said segment of optical fiber being coupled to said first and second sections of dispersion compensating fiber via said first and second fiber optic adapters, respectively.

11. An optical device in accordance with claim 10, wherein at least one of said first and second fiber optic adapters is recessed within said housing.

12. An optical device in accordance with claim 10, wherein said first tray has a primary surface and a secondary surface, said section of dispersion compensating fiber being provided on said primary surface of said tray and said secondary surface extending from said primary surface, said adapter being oriented at an angle relative to secondary surface.

13. An optical device in accordance with claim 7, further comprising:

a third tray vertically disposed relative to one of said first and second trays;

a third section of dispersion compensating fiber disposed in said tray; and an additional segment of optical fiber coupling said third section of dispersion compensating fiber to one of said first and second sections of dispersion compensating fiber.

14. An optical device in accordance with claim 7, wherein said housing further comprises a rail, said second tray being configured to slide on said rail within said housing.

15. An optical device in accordance with claim 7, further comprising:

a first handle coupled to said first tray; and a second handle coupled to said second tray, said first and second handles being configured to slidably remove said first and second trays, respectively, from said housing.

* * * * *